United States Patent [19]

Fox et al.

[11] Patent Number: 4,595,509

[45] Date of Patent: Jun. 17, 1986

[54] CONTINUOUS SEPARATION PROCESS

[75] Inventors: Lawrence L. Fox, Bethel Park; Nelson J. Merrick, McCandless, both of Pa.

[73] Assignee: Aluminum Company of America, Pittsburgh, Pa.

[21] Appl. No.: 639,091

[22] Filed: Aug. 9, 1984

[51] Int. Cl.$^4$ ................................................ C02F 1/28
[52] U.S. Cl. .................................... 210/665; 210/673; 210/691; 210/909
[58] Field of Search ............... 210/691, 908, 909, 799, 210/673, 677, 663, 665, 666, 667, 748, 708

[56] References Cited

U.S. PATENT DOCUMENTS

| | | | |
|---|---|---|---|
| 3,574,329 | 4/1971 | Beavon | 210/799 X |
| 3,594,314 | 7/1971 | Bilhartz et al. | 210/799 X |
| 3,925,202 | 12/1975 | Hirs | 210/799 X |
| 4,116,827 | 9/1978 | Sawyer | 210/691 X |
| 4,126,546 | 11/1978 | Hjelmner et al. | 210/19 |
| 4,131,543 | 12/1978 | Carosello | 210/909 X |
| 4,144,162 | 3/1979 | Edgar et al. | 210/909 X |
| 4,177,139 | 12/1979 | Hahn et al. | 210/909 X |
| 4,197,201 | 4/1980 | Hjelmner et al. | 210/189 |
| 4,382,865 | 5/1983 | Sweeny | 210/909 X |

FOREIGN PATENT DOCUMENTS 53-101847  9/1978  Japan .................................. 210/909

OTHER PUBLICATIONS

EPA Project Summary, "Interim Guidelines for the Disposal/Destruction of PCBs and PCB Items by Non-Thermal Methods," E. M. Sworzyn and D. G. Ackerman, United States Environmental Protection Agency, Jul. 1982, pp. 1–3.

*Primary Examiner*—Thomas Wyse
*Attorney, Agent, or Firm*—Douglas G. Glantz

[57] ABSTRACT

Disclosed is a continuous process for removing an organic compound from water including passing an influent of water and organic compound through a filter bed of hard, substantially non-porous, inorganic particles to separate the organic compound and form a water effluent of reduced organic amounts, washing the particles to remove the organic compound and form a concentrated organic effluent, and recycling washed particles to the filter bed. The continuous process includes washing at a washing rate sufficient to shear organic compounds from solid filter media particles.

20 Claims, No Drawings

CONTINUOUS SEPARATION PROCESS

BACKGROUND OF THE INVENTION

1. Technical Field

This invention relates to a continuous process for separating organic compounds from water.

2. Description of the Prior Art

The chemical process industry for some time now has been researching and developing chemical engineering processes for the removal of synthetic organic compounds from the environment. Typically, these artificially produced organic compounds have been identified as potentially toxic to man either directly or indirectly through the food chain. Examples include polychlorinated biphenols (PCBs), chlorodiphenols, Aroclors ®, Kanechlors ®, and their cogeners.

PCBs were first synthesized over 100 years ago. Under standard conditions, they exist as heavy liquids weighing from about 1.2 to 1.4 kilograms per liter in the form of a slightly viscous oil to a sticky resin. PCBs are derivatives of the compound biphenol in which 1 to 10 hydrogen atoms have been replaced with chlorine atoms. PCBs are fire resistant and have high boiling points. PCBs have extremely high chemical and thermal stability and are quite useful in commercial applications such as dielectric fluids for capacitors and transformers, as heat transfer and hydraulic fluids, pigments, plasticizers, fluids for carbonless copying paper and electromagnets, and as components in cutting oils.

PCBs were widely used in the last 50 years. A lack of recognition of the hazards led to their wide distribution in the environment. Although the United States Environmental Protection Agency has labeled PCBs as having fairly low acute toxicities, some adverse effects have been found in humans, laboratory animals, and other organisms. There is some evidence that PCBs bioaccumulate and may be carcinogenic. Concern over the PCB contamination problem has led to toxic substances control legislation that will require the eventual elimination of the use of PCBs in the United States.

Separation and removal from water of PCBs in very low levels, i.e., part per billion levels, is a complex and expensive task. PCBs are colorless, odorless, and relatively insoluble in water. The Industrial Environmental Research Laboratory of the U.S. Environmental Protection Agency has specified the solubility of PCBs in water to be in the range of 0.007–5.9 mg/l or 7–5900 parts per billion (ppb). This solubility level indicates that physical separation techniques most likely would be unsuccessful in separating PCB from waste water to below 7–5900 ppb, and that a chemical separation process would be the technique of choice for achieving lower PCB levels.

Conventional chemical engineering practice employs a carbon adsorption process for removing chlorinated hydrocarbons, including PCBs, from an aqueous waste stream. The waste water is passed through a vessel filled with activated carbon in the form of carbon slurry or granules. Impurities from the aqueous stream are removed by adsorption onto the carbon. Activated carbon has an affinity for organics and is commonly used on a commercial scale for organic contaminant removal from waste water. However, activated carbon adsorption of PCBs has a major drawback in that it requires the disposal or regeneration of the carbon adsorbor.

Other conventional physical/chemical separation processes are used to remove PCBs from waste water. Sedimentation, coagulation, and flocculation are examples of conventional physical or chemical separation process which can be used for PCB removal from waste water. According to O'Brien and Gere Engineers, Inc., conventional techniques can remove 50 to 80% of the PCBs at influent levels in the range of 1 to 20 micrograms per liter. The New York State Department of Environmental Conservation has also concluded that these conventional techniques can remove 50 to 80% of the PCBs at influent levels in the range of 1 to 10 micrograms per liter and that 90% removal via a coagulation/filtration process represents the highest reduction consistently achievable in existing plants. While higher removals may be theoretically possible, the degree of control required for these removals and the normal variations in the quality of surface waters combine to set 90% removal as a practical limit.

Governmental regulatory agencies at the federal and state levels have mandated a reduction in PCB content in waste waters to levels less than 1 ppb. Reductions in other synthetic chemicals, such as dioxin, similarly have been proscribed to levels below that detectable by conventional analytical techniques.

Even though PCBs, dioxins, or other regulated organic substances have not been used for many years in a particular industrial facility, these substances have been observed in the discharges even after substantial cleanup programs have been carried out. A process is needed to clean up low level amounts of these contaminants in waste water discharged from most industrial facilities.

It is an object of the present invention to provide a continuous process for removing slightly soluble synthetic organic compounds from water.

It is another object to provide a continuous process for removing organic compounds from waste water while eliminating the disposal or regeneration problems associated with contaminated filter media.

It is a further object to provide a continuous process for removing organic compounds in low level amounts from waste water in a cost-efficient manner.

SUMMARY OF THE INVENTION

In accordance with the present invention, a process is provided for removing an organic compound from water including the steps of passing an influent of water containing an organic compound through a filter bed of hard, substantially non-porous, inorganic particles to separate the organic compound and form a water effluent of reduced organic concentration, washing the particles to remove the organic compound and form a concentrated organic effluent, and recycling the washed particles to the filter bed.

DETAILED DESCRIPTION

The process of the present invention includes processing an influent of water and organic compound through a filter bed of particles composed of a hard, substantially non-porous, substance. The process is performed continuously by including the steps of washing the particles to remove the organic compound and recycling the washed particles to the filter bed. As opposed to carbon absorption which requires regeneration or disposal of the filter media, the process of the present invention provides a continuous washing and recycling of the filter media used in the filter bed.

The filter media particles employed in the process of the present invention are characterized as hard and substantially non-porous. Such a material for the filter particles is required to perform the continuous process with high efficiency. The continuous process of the present invention further is unique in using inorganic particles for the filter bed. It has been found that organic particles such as petroleum derivatives, e.g., plastics or resins, do not work in this continuous process. Such organic particles act as an adsorbent or adherent material, to which adheres the organic compound contaminant to be removed from the waste water. The washing step to remove organic compounds from the organic filter particles does not work, thus necessitating the disposal of the organic filter media.

The present process is intended for low level amounts of synthetic organic compounds such as PCBs. By "low level" amounts, amounts in water in the range of about 1 to 20 ppb are intended. The process includes pre-treating steps to bring the waste water influent to within the prescribed range. One or more physical or chemical pre-treatment steps can be incorporated into the process to precipitate the organic compound, such as PCB. These physical/chemical pre-treating steps include emulsion breaking, sedimentation, coagulation, flocculation, and clarification to remove oil, sediments, and other foreign materials. These pre-treating steps can be implemented in conventional chemical engineering designs to bring the influent to the filter bed to within the range of about 1 to 20 ppb PCB.

The organic compounds removed by the present process include synthetically produced organic compounds, typically characterized by high molecular weight and low solubility in water. Such synthetic organic compounds include polychlorinated biphenols (PCBs), chlorodiphenols, Aroclors ®, Kanechlors ®, and their cogeners. The process can be implemented as a tertiary cleanup for the removal of such organic materials to parts per billion levels.

In one aspect, the process implements an equalization tank upstream from the filter bed. The equalization tank overcomes varying influent flow rates and provides a steady flow rate through the filter bed. A steady flow rate to the filter bed is important to avoid hydraulic shear of organic contaminants from the filter media prior to the particle washing step.

Chlorine can be added to the equalization tank to inhibit microbiological growth. Influent from the equalization tank to the filter bed can be pumped or gravity fed to overcome the pressure drop through the filter bed.

The filter media of hard, substantially non-porous, inorganic particles preferably has a specific particle size. It has been found that a particle size in the range of about 0.9–0.95 mm at a uniform coefficient of less than about 1.5 in a 40-inch deep filter bed effectively removes low level organic compounds from the waste water. The specified particle size provides high hydraulic loading rates, e.g., above 4 gallons per minute per square foot, without high pressure drop and while avoiding local fluidization of the filter media and consequent breakthrough of the suspended solid. The particle size of 0.9–0.95 mm allows for the proper transport of the media in the filter bed itself. In this way, the media will not compact and stop moving as other smaller-sized media will do in such a filter.

It has been found that silica is particularly effective as the filter media in the process of the present invention. Silica provides a relatively hard material which resists degradation when the process is performed in a highly turbulent or highly agitated filter bed. Silica is substantially inert, thereby resisting chemical degradation over long-term filter media contact.

It has been found that a round grain-shape assists in the transport of sand in the filter bed and performs well. Angular media lock together and inhibit effective filter media transport.

The step of passing influent water containing organic contaminants through the filter bed preferably is carried out in countercurrent flow. The influent water enters one end of the filter and flows toward the opposite end, which opposite end serves as the entrance for washed filter particles. In this way, the most contaminated water contacts the most contaminated filter particles and the cleanest water contacts the cleanest washed filter particles.

It has been found that the washing step must employ sufficiently agitated or turbulent flow rates to scour and hydraulically shear the particles and separate the organic compound. In another aspect, the washing step includes shocking the filter media particles to shear the organic compound from the solid particles. Shocking can be achieved by an ultrasonic wave generator. The washing fluid, e.g., water, then becomes contaminated with particulate matter and organic compound.

The particle washing step can be performed by passing a washing media in countercurrent flow past the spent filter media particles. In one aspect, the process of the present invention includes washing the particles with a portion of the water effluent formed in and exiting the filter bed.

The concentrated organic effluent formed when washing the filter media particles to remove the organic compounds can be recycled to the pre-treating steps where the organic compounds will be effectively removed in a concentrated form as part of the primary waste water. The concentrated form permits effective removal in the primary and secondary physical/chemical separation steps of the same PCBs which previously passed through in low level amounts. This also results in lower quantities of PCB contaminated materials for disposal than would have resulted if carbon adsorption were used.

In one embodiment, a filter bed suitable for use in the process of the present invention is shown and described in U.S. Pat. No. 4,126,546 which is hereby incorporated by reference into this detailed description of the present invention. It has been found that such a filter combined with the specific filter media particles, described supra, surprisingly removes organic compounds such as PCBs with high efficiency. However, the present process is not limited to the apparatus configurations and process limitations as disclosed and claimed in U.S. Pat. No. 4,126,546. Rather, the particle washing step of the present invention, for example, can take place outside of the filter bed apparatus.

A process in accordance with the present invention has been found to reduce PCBs in waste water to an unexpectedly low level. This continuous process incorporated physical/chemical pre-treating to remove approximately 85 to 95% of the PCBs in the incoming waste water. The PCB concentration in the incoming waste water ranged from 360 to 12,000 ppb. The remaining PCBs in the pre-treated water passed into an equalization tank which provided a steady flow rate to the filter. Water samples were analyzed for PCBs using EPA Test Method 608 for Organochlorine Pesticides and PCBs. The process continuously and consistently reduced PCB levels to below 1.0 parts per billion (ppb) and in many cases to below 0.5 ppb with an influent PCB concentration ranging from about 1.0 to 8.0 ppb. Since the solubility of PCBs ranges from 7 to 5900 ppb, this present invention, removing PCBs to below 1 ppb, is more efficient than could have been predicted. Further, this present invention's ability to achieve better than the commonly accepted theoretical limit of a 90% PCB removal could not have been predicted. Additionally, the invention operates continuously to remove PCBs to these low levels without media replacement. A reject line from the filter bed carried separated PCBs from the filter bed back to the clarifier where the PCBs collected as sludge.

What is claimed is:

1. A continuous physical separation process for purifying water contaminated with low level concentrations of PCB's without replacement or disposal of filter bed media comprising:
   (a) passing water contaminated with low level concentrations of PCB's in the range of about 1-20 ppb through a filter bed of hard, substantially non-porous, inorganic particles to separate said PCB's and form contaminated particles and purified water of reduced PCB's concentration;
   (b) hydraulically shearing said contaminated particles to remove said PCB's and form decontaminated particles and a concentrated PCB's effluent; and
   (c) recycling said decontaminated particles to said filter bed.

2. A continuous process as set forth in claim 1 wherein said PCB's have low solubility in water.

3. A continuous process as set forth in claim 2 wherein said PCB's have high molecular weight.

4. A continuous process as set forth in claim 1, said shearing comprising contacting at least a portion of said contaminated water.

5. A continuous process as set forth in claim 4 comprising recycling said concentrated PCB's effluent to said pre-treating step.

6. A continuous process as set forth in claim 5 wherein said filter particle has a size in the range of about 0.9-0.95 mm at a uniformity coefficient of less than about 1.5.

7. A continuous process as set forth in claim 6 wherein said particles are composed essentially of silica.

8. A continuous process as set forth in claim 7 wherein said shearing comprises ultrasonically shocking said contaminated particles to shear the PCB's.

9. A continuous process as set forth in claim 7, said silica having a substantially round, smooth surface.

10. A continuous process as set forth in claim 9 wherein said shearing comprises washing at a turbulent flow rate sufficient to shear the PCB's from silica particles.

11. A continuous process as set forth in claim 10 wherein said contaminated water passes through said filter bed at a filtering flow rate that will avoid shearing of PCB's from said particles.

12. A continuous process as set forth in claim 11 wherein said filtering flow rate is a predetermined rate, lower than a particulate removal flow rate, based on PCB concentration and filter size.

13. A continuous process as set forth in claim 11 further comprising an equalization tank upstream from the filter bed.

14. A continuous process as set forth in claim 13 further comprising adding chlorine to the equalization tank.

15. A continuous process as set forth in claim 14 wherein said clarification includes either a flocculating clarifier or an upflow sludge blanket clarifier to break any emulsion and to remove oil.

16. A continuous process as set forth in claim 1 further comprising pre-treating water containing more than said low level concentration of PCB's through one or more chemical or physical process steps to precipitate said PCB and reduce PCB concentration to less than about 20 ppb, including emulsion breaking, sedimentation, coagulation, flocculation, clarification to remove oil, sediments, and other foreign materials.

17. A continuous process as set forth in claim 1 wherein said low level concentration of PCB's comprises less than about 8.0 ppb.

18. A continuous process as set forth in claim 15 wherein said contaminated water is passed upflow through said filter bed.

19. A continuous process for removing low level concentrations of PCB from water comprising:
   (a) passing contaminated water containing PCB's in an amount of 1 to 20 ppb through a filter bed of filter media particles having a size in the range of about 0.9-0.95 mm at a uniformity coefficient of less than about 1.5 to separate PCB and form contaminated particles and purified water effluent having less than about 1.0 PCB part per billion;
   (b) hydraulically shearing the contaminated particles by contacting with a portion of said contaminated water to form a concentrated PCB effluent;
   (c) washing said decontaminated particles in a portion of said purified water to remove residual PCB's;
   (d) mixing said residual PCB's with said concentrated PCB effluent; and
   (e) recycling decontaminated particles to the filter bed.

20. A continuous process as set forth in claim 19 wherein shearing the contaminated particles comprises washing at an agitated or turbulent flow rate sufficient to shear PCB's from said contaminated particles.

* * * * *